US009619265B2

(12) United States Patent
Kruglick

(10) Patent No.: US 9,619,265 B2
(45) Date of Patent: Apr. 11, 2017

(54) RECONFIGURATION WITH VIRTUAL MACHINE SWITCHING

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 179 days.

(21) Appl. No.: 14/233,848

(22) PCT Filed: Jun. 25, 2013

(86) PCT No.: PCT/US2013/047650
§ 371 (c)(1),
(2) Date: Jan. 20, 2014

(87) PCT Pub. No.: WO2014/209286
PCT Pub. Date: Dec. 31, 2014

(65) Prior Publication Data
US 2015/0205629 A1 Jul. 23, 2015

(51) Int. Cl.
G06F 9/455 (2006.01)
G06F 9/48 (2006.01)

(52) U.S. Cl.
CPC ........ G06F 9/45558 (2013.01); G06F 9/4856 (2013.01); G06F 2009/4557 (2013.01); G06F 2009/45583 (2013.01)

(58) Field of Classification Search
CPC .................. G06F 9/45558; G06F 9/48; G06F 2009/4557; G06F 2009/45583

USPC ............................................................ 718/1
See application file for complete search history.

(56) References Cited

U.S. PATENT DOCUMENTS

| 6,438,737 B1 * | 8/2002 | Morelli ............... G06F 15/7867 326/38 |
| 7,502,884 B1 | 3/2009 | Shah |
| 7,703,107 B2 | 4/2010 | Chen |
| 8,020,176 B2 | 9/2011 | Chen |
| 2004/0123258 A1 * | 6/2004 | Butts ................... G06F 17/5027 716/106 |

(Continued)

OTHER PUBLICATIONS

M. Vuletid, L. Pozzi, and P. Ienne, "Seamless hardware-software integration in reconfigurable computing systems," IEEE Design & Test of Computers 22, No. 2, Apr. 2005, 102-113.

(Continued)

Primary Examiner — Li B Zhen
Assistant Examiner — Daniel Wei
(74) Attorney, Agent, or Firm — Moritt Hock & Hamroff LLP; Steven S. Rubin, Esq.

(57) ABSTRACT

Technologies are generally described for systems and methods for reconfiguring a programmable circuit. An accelerator reconfiguration device may detect a trigger. The trigger may indicate that a command has been sent to a processor to switch from execution of a first virtual machine to a second virtual machine. In response to detecting the trigger, the reconfiguration device may identify a programmable circuit and program for the programmable circuit associated with the second virtual machine. The reconfiguration device may further generate a write command to write the program to the programmable circuit.

26 Claims, 8 Drawing Sheets

(56) References Cited

U.S. PATENT DOCUMENTS

| | | | |
|---|---|---|---|
| 2005/0132363 A1* | 6/2005 | Tewari | G06F 9/45558 718/1 |
| 2006/0224816 A1* | 10/2006 | Yamada | G06F 12/109 711/6 |
| 2007/0192765 A1 | 8/2007 | Shimogawa et al. | |
| 2011/0161955 A1* | 6/2011 | Woller | G06F 9/4406 718/1 |
| 2011/0246691 A1 | 10/2011 | Stillwell, Jr. et al. | |
| 2012/0117562 A1* | 5/2012 | Jess | G06F 9/45558 718/1 |
| 2013/0152086 A1 | 6/2013 | Yoo et al. | |

OTHER PUBLICATIONS

J. H Kelm and S. S Lumetta, "HybridOS: runtime support for reconfigurable accelerators," in Proceedings of the 16th international ACM/SIGDA symposium on Field programmable gate arrays (ACM, 2008), 2008, 212-221.

D. Andrews et al., "Achieving programming model abstractions for reconfigurable computing," Very Large Scale Integration (VLSI) Systems, IEEE Transactions on 16, No. 1, 2008, 34-44.

L. Pozzi et al., "Enabling unrestricted automated synthesis of portable hardware accelerators for virtual machines," in Third IEEE/ACM/IFIP International Conference on Hardware/Software Codesign and System Synthesis, 2005, 243-248.

K. Biswas and M. Islam, "Hardware Virtualization Support in INTEL, AMD and IBM Power Processors," International Journal of Computer Science and Information Security, 2009, 6 pages, vol. 4, No. 1 & 2.

"AMD "Pacifica" Virtualization Technology", retrieved from http://www.slideshare.net/Cameroon45/amd-pacifica-virtualization-technology, Jun. 2010, 18 pages.

"Hardware-Assisted Virtualization Technology", Intel, retrieved from http://www.intel.com/technology/virtualization/technology.htm, downloaded Jan. 16, 2014, 3 pages.

F. Campi, et al., "A VLIW processor with reconfigurable instruction set for embedded applications," in Solid-State Circuits Conference, 2003. Digest of Technical Papers. ISSCC. 2003 IEEE International, 2003, pp. 250-491 vol. 1.

H. Singh et al., "MorphoSys: An integrated re-configurable architecture," in Proc. NATO Symp. System Concepts and Integration, Monterey,CA, Apr. 1998, 16 pages.

R. Maestre, et al., "A framework for reconfigurable computing: task scheduling and context management," IEEE Transactions on Very Large Scale Integration (VLSI) Systems, 2001, vol. 9, pp. 858-873.

Y. Zhi Alex, et al., "CHIMAERA: a high-performance architecture with a tightly-coupled reconfigurable functional unit," presented at the Proceedings of the 27th annual international symposium on Computer architecture, 2000, 11 pages.

Burger, TW, "Intel Virtualization Technology for Directed I/O (VT-d): Enhancing Intel platforms for efficient virtualization of I/O devices", retrieved from http://software.intel.com/en-us/articles/intel-virtualization-technology-for-directed-io-vt-d-enhancing-intel-platforms-for-efficient-virtualization-of-io-devices/, Mar. 5, 2012, 9 pages.

Veldema, R. et al., "Enabling Multiple Accelerator Acceleration for Java/OpenMP", Hot Par '11 Proceedings of the 3rd USENIX conference on Hot topic in parallelism, 2011, 6 pages.

International Search Report for application with application No. PCT/US2013/047650, dated Sep. 16, 2013, 9 pages.

International Search Report and Written Opinion for application with application No. PCT/US2013/047650, dated Sep. 16, 2013, 9 pages.

* cited by examiner

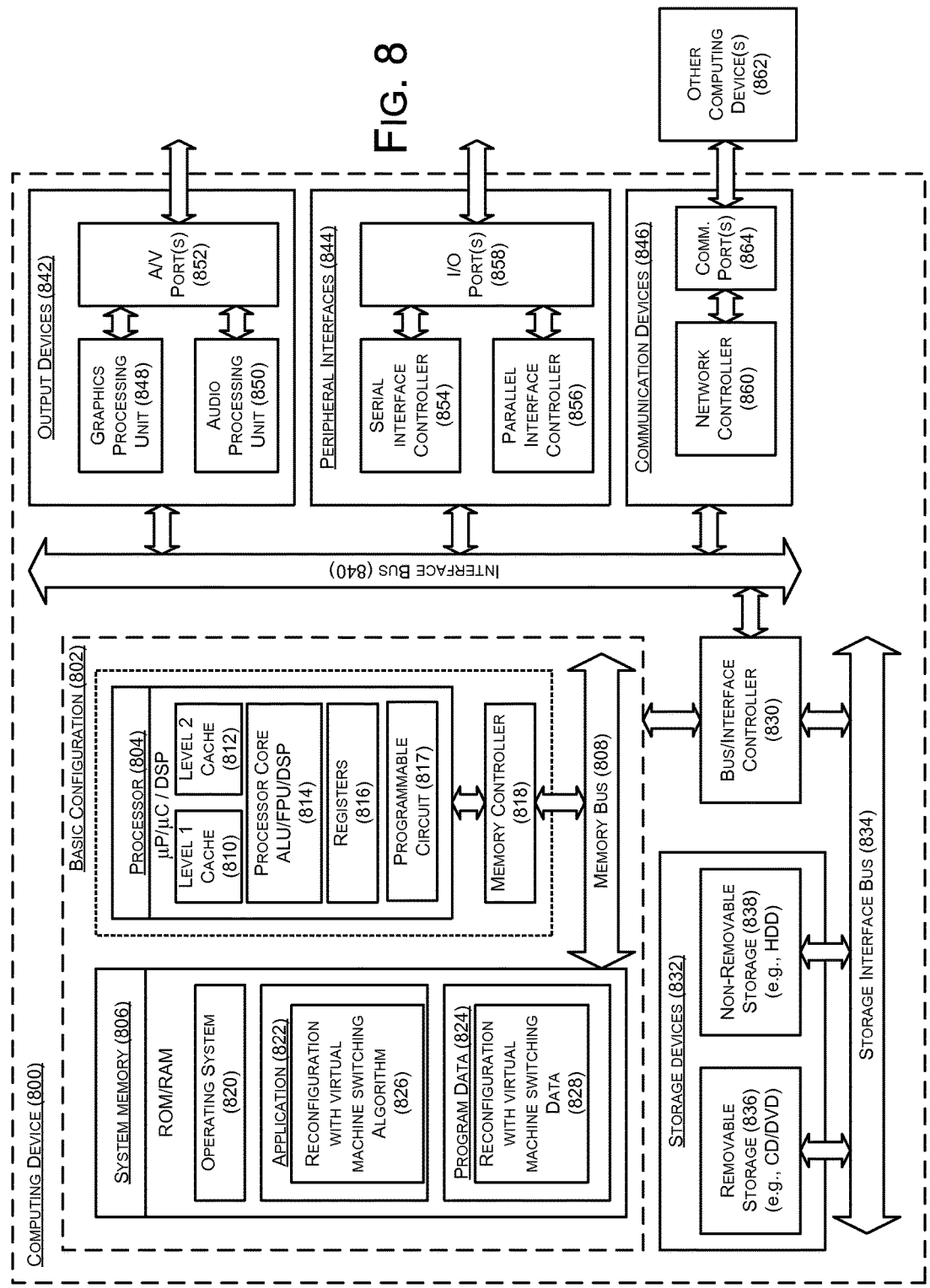

RECONFIGURATION WITH VIRTUAL MACHINE SWITCHING

CROSS-REFERENCE TO RELATED APPLICATION

This application is a U.S. National Stage filing under 35 U.S.C. 371 of International Application No. PCT/US2013/047650 filed on Jun. 25, 2013 ("International Application"). The disclosure of the International Application is hereby incorporated by reference in its entirety.

BACKGROUND

Unless otherwise indicated herein, the materials described in this section are not prior art to the claims in this application and are not admitted to be prior art by inclusion in this section.

In multi-core architectures, multiple processor cores may be included in a single integrated circuit die or on multiple integrated circuit dies that are arranged in a single chip package. A cache may be used to store data for access by one or more of the processor cores. An accelerator may be a special purpose processor focused on one or more applications.

SUMMARY

In some examples, methods of reconfiguring a programmable circuit are generally described. The methods may include detecting a trigger. The trigger may indicate a command has been sent to a processor to switch from execution of a first virtual machine to a second virtual machine. The methods may include, in response to detecting the trigger, selecting a programmable circuit and a program for the programmable circuit, where the programmable circuit is associated with the second virtual machine. The methods may further include generating a write command to write the program to the programmable circuit.

In some examples, devices effective to reconfigure a programmable circuit are generally described. The devices may include a memory, a switch detector, and a second processor. The switch detector may be effective to detect a trigger. The trigger may indicate that a command has been sent to a first processor to switch from execution of a first virtual machine to a second virtual machine. The second processor may be configured to be in communication with the memory and the switch detector. The second processor may be effective to detect the trigger. The second processor may be effective to identify an accelerator and accelerator map for the programmable circuit associated with the second virtual machine. The second processor may be effective to generate a write command to write the accelerator map to the accelerator.

In some examples, systems effective to reconfigure a programmable circuit are generally described. The systems may include a first processor, a virtual machine manager, a programmable circuit, and a reconfiguration device. The virtual machine manager may be effective to send a command to the first processor to switch from execution of a first virtual machine to a second virtual machine. The virtual machine manager may further be effective to generate a trigger in response to the command. The reconfiguration device may include a memory, a switch detector, and a second processor. The second processor may be effective to detect the trigger. The second processor may be effective to identify the programmable circuit and a map associated with the second virtual machine. The second processor may be effective to generate a write command to write the map to the programmable circuit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 is a block diagram illustrating an example computing device that is arranged to implement reconfiguration with virtual machine switching; all arranged according to at least some embodiments described herein.

DETAILED DESCRIPTION

Figure 1:
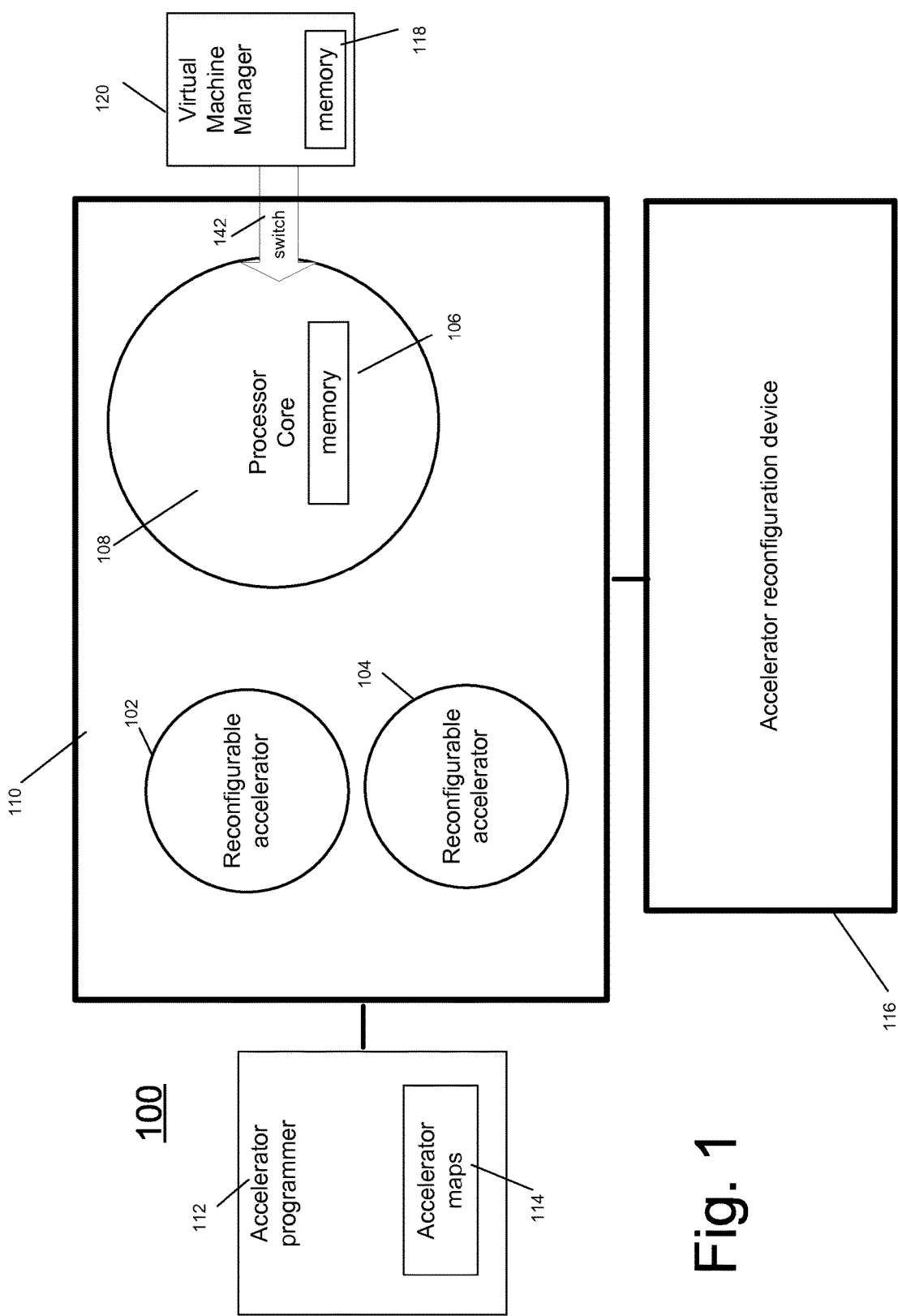
FIG. 1 illustrates an example system that can be utilized to implement reconfiguration with virtual machine switching.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to reconfiguration with virtual machine switching.

Briefly stated, technologies are generally described for systems and methods for reconfiguring a programmable circuit. An accelerator reconfiguration device may detect a trigger. The trigger may indicate that a command has been sent to a processor to switch from execution of a first virtual machine to a second virtual machine. In response to detecting the trigger, the reconfiguration device may identify a programmable circuit and a program for the programmable circuit associated with the second virtual machine. The reconfiguration device may further generate a write command to write the program to the programmable circuit.

FIG. 1 illustrates an example system that can be utilized to implement reconfiguration with virtual machine switching arranged in accordance with at least some embodiments described herein. An example system 100 may include a processor core 108, a programmable circuit such as an accelerator 102, a programmable circuit such as an accelerator 104, a programmer such as an accelerator programmer 112, a virtual machine manager 120 and/or an accelerator reconfiguration device 116 all arranged in communication with one another. Accelerator programmer 112 may be a dedicated unit or a general purpose processor. Processor core 108 may include a memory 106 effective to store information that may be used by processor core 108 during operation. Accelerators 102 or 104 may be configured or reconfigured by a map 114 to be operable to execute a particular application or code. In some examples, one or more of processor core 108, reconfigurable accelerators 102, 104, accelerator programmer 112, virtual machine manager 120 and/or an accelerator reconfiguration device 116 may be located on the same die 110. In other examples, one or more of processor core 108, reconfigurable accelerators 102, 104, accelerator programmer 112, virtual machine manager 120 and/or an accelerator reconfiguration device 116 may be located on different dies. Accelerator reconfiguration device 116 may be implemented as software, hardware, or a combination of software and hardware. Accelerator reconfiguration device 116 may be part of virtual machine manager 120. Processor core 108 may be configured to use one or more of reconfigurable accelerator 102, 104 to perform operations or tasks.

Accelerator programmer 112 may include accelerator maps 114. Accelerator maps 114 may correspond to one or more programs for reconfigurable accelerators 102, 104. Accelerator maps 114 may include binary data that may be streamed into gates of reconfigurable accelerators. Accelerator programmer 112 may be configured to program reconfigurable accelerators 102, 104 based on accelerator maps 114.

Accelerator programmer 112 may be configured to program reconfigurable accelerators 102, 104 based on accelerator maps 114. For example, accelerator maps 114 may be effective to define states of gates or switches in an FPGA (field programmable gate array), EEPROM (electrically erasable programmable read only memory), of reconfigurable accelerators 102, 104. During operation, processor core 108 may control accelerator programmer 112 to load a requested accelerator map 114 into reconfigurable accelerator 102, 104 based on an execution queue.

In an example, virtual machine manager 120 may send a command to processor core 108 to implement a first virtual machine. After a period of time, virtual machine manager 120 may send a switch command 142 to processor core 108 to implement a second virtual machine. Virtual machine manager 120 may be, for example, a hypervisor. For example, switch command 142 may be effective to implement a context switch in processor core 108 or a world switch in processor core 108. In a context switch, processor core 108 may stop processing instructions that correspond to the first virtual machine and may start processing instructions that correspond to the second virtual machine. In context switching, a state of processor core 108 may remain unaltered. In some examples, the state of processor core 108 may correspond to the state registers, buffers, caches etc. of processor core 108. Context switching may be used in situations where resources are shared between operations and those resources modify user memory but not low level system state.

Virtual machine manager 120 may be used to implement a world switch in situations where a virtual machine being implemented by processor core 108 requests access to low level system states. In world switching, processing states may be captured and saved and then replaced with a saved state of another virtual machine or "world".

As discussed in more detail below, virtual machine manager 120 may be configured to send switch command 142 to processor core 108. Switch command 142 may be a command to processor core 108 to switch from a first virtual machine to a second virtual machine. Switch command 142 may be, for example, a world switch command or a context switch command. For example, information in registers and queues of processor core 108, and information regarding states, and other processor core information may be saved by virtual machine manager 120 and stored in VMM memory 118. Prior information relating to the second virtual machine may be transferred from VMM memory 118 to processor core 108 by virtual machine manager 120. Accelerator reconfiguration device 116 may be configured to detect switch command 142. Accelerator reconfiguration device 116 may further be configured to reconfigure one or more of reconfigurable accelerators 102, 104 in response detecting switch command 142.

Figure 2:
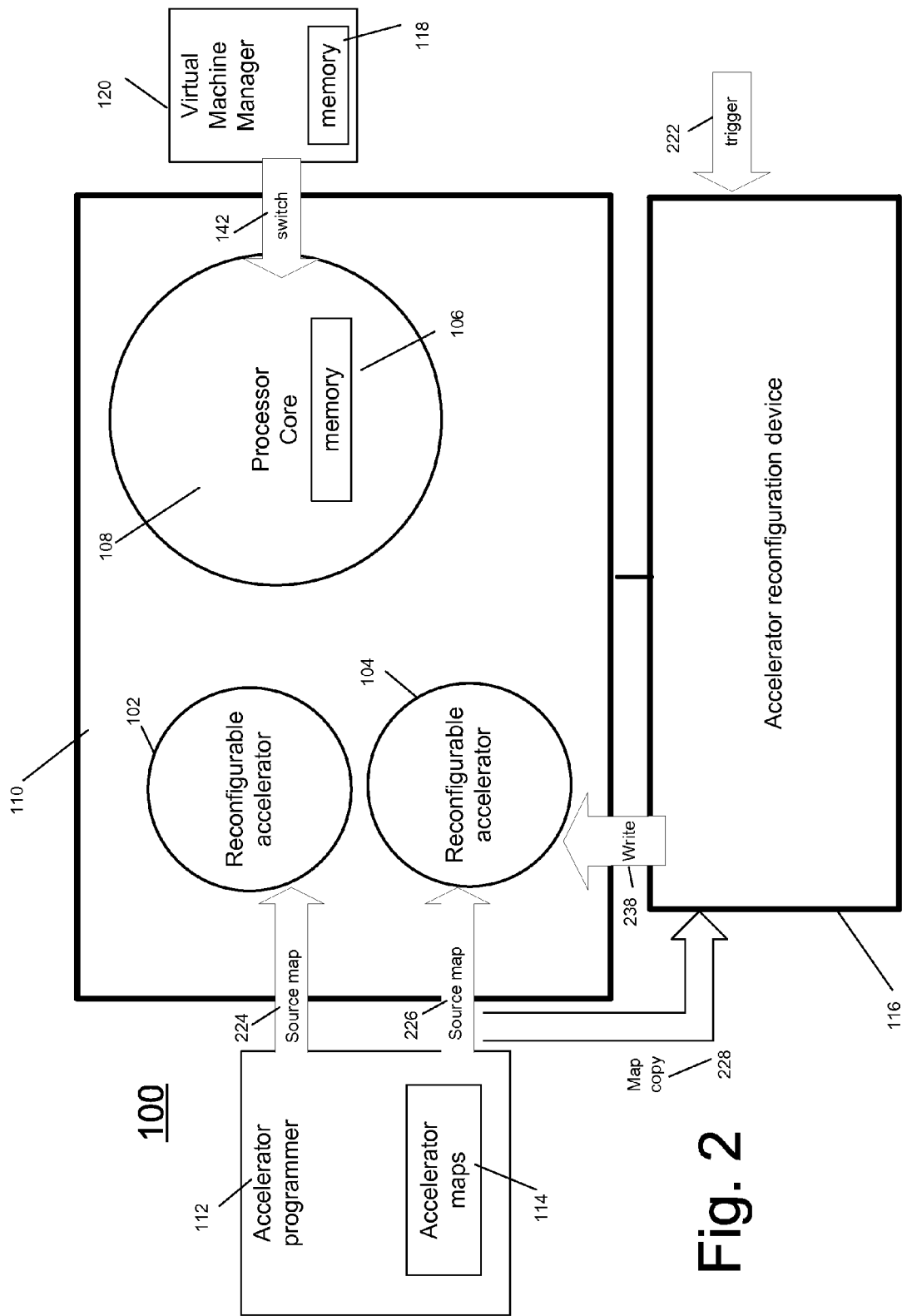
FIG. 2 illustrates an example system that can be utilized to implement reconfiguration with virtual machine switching.

FIG. 2 illustrates an example system that can be utilized to implement reconfiguration with virtual machine switching arranged in accordance with at least some embodiments described herein. Those components in FIG. 2 that are labeled identically to components of FIG. 1 will not be described again for the purposes of clarity.

In some examples, in response to a request such as from processor core 108, accelerator programmer 112 may load map 224 to reconfigurable accelerator 102. Accelerator programmer 112 may also load map 226 to reconfigurable accelerator 104. When accelerator programmer 112 loads maps 224, 226 to reconfigurable accelerators 102, 104, a map copy 228, that includes a copy of map 224 and/or 226, may be sent to accelerator reconfiguration device 116. In examples where virtual machine manager 120 sends switch command 142 to processor core 108, virtual machine manager 120 may also send a trigger 222 to accelerator reconfiguration device 116. Trigger 222 may indicate that virtual machine manager 120 has sent switch command 142 to processor core 108. In response to detecting trigger 222, accelerator reconfiguration device 116 may send a write command 238 to an appropriate reconfigurable accelerator 102, 104. Write command 238 may be a command to write the map in map copy 228 to an applicable reconfigurable accelerator 102, 104. In example examples, write command 238 may be routed through accelerator programmer 112.

Figure 3:
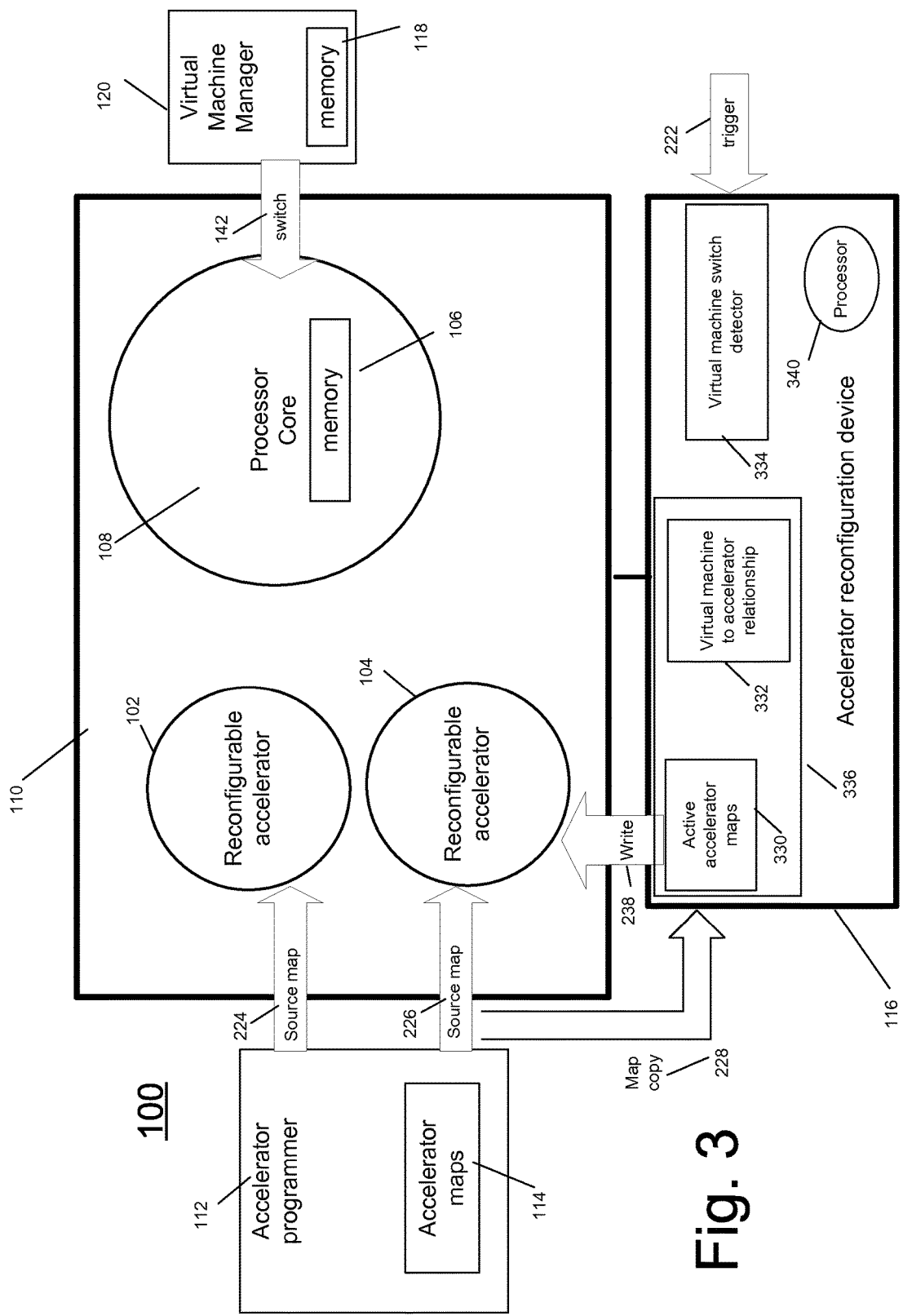
FIG. 3 illustrates an example system that can be utilized to implement reconfiguration with virtual machine switching.

FIG. 3 illustrates an example system that can be utilized to implement reconfiguration with virtual machine switching arranged in accordance with at least some embodiments described herein. Those components in FIG. 3 that are labeled identically to components of FIGS. 1 and 2 will not be described again for the purposes of clarity.

Accelerator reconfiguration device 116 may include a processor 340, a reconfiguration memory 336 and/or a virtual machine switch detector 334. Reconfiguration memory 336 may be adapted to store active accelerator maps 330 and/or virtual machine to accelerator relationships data 332. In examples where accelerator reconfiguration device 116 receives map copy 228, copies of maps for reconfigurable accelerators 102, 104 may be stored in active accelerator maps 330. Processor 340 may determine an active virtual machine at a time when maps 224, 226 are sent to reconfigurable accelerators 102, 104. In some examples, a program executing within a virtual machine may recognize accelerator maps that are active. Processor 340 may store an association between the active virtual machine and active accelerator maps 224, 226 in virtual machine to accelerator relationships data 332. Virtual machine to accelerator relationships data 332 may include a table identifying relationships between virtual machines, accelerators, and accelerator maps. When reconfigurable accelerators 102, 104 are similar in design (in a homogeneous accelerator configuration), relationships between virtual machines and accelerator maps may be stored. When reconfigurable accelerator 102, 104 are dissimilar in design (in a heterogeneous accelerator configuration), relationships between virtual machines, accelerators and accelerator maps may be stored.

Virtual machine switch detector 334 may be configured to detect switch command 142 such as by detecting trigger 222. When trigger 222 is detected by virtual machine switch detector 334, processor 340 may identify the particular virtual machine identified in switch command 142. For example, trigger 222 may be a signal sent from virtual machine manager 120 and may identify the particular virtual machine in switch command 142. Processor 340 may then analyze virtual machine to accelerator relationships data 332 to identify a particular reconfigurable accelerator associated with the particular virtual machine. Processor 340 may also identify the particular accelerator map from active accelerator maps 330 associated with the particular virtual machine. Processor 340 may generate write command 238 to write the particular accelerator map to the particular reconfigurable accelerator.

Active accelerator maps 330 may include a number of accelerator maps for each virtual machine. In the example, two reconfigurable accelerators are shown. If three virtual machines are implemented, 6 active accelerator maps may be stored.

In examples where accelerator programmer 112 loads maps 224, 226 to reconfigurable accelerator 102, 104, map copy 228 may be sent to accelerator reconfiguration device 116. Map copy 228 may, for example, be provided through a wired copy action. For example, a wire or other communication medium may be used to extract map copy 228 when maps 224, 226 are loaded to reconfigurable accelerators 102, 104. In another example, when accelerator programmer 112 loads maps 224, 226 to reconfigurable accelerators 102, 104, accelerator programmer 112 may also send map copy 228 to accelerator reconfiguration device 116. In another example, when accelerator programmer 112 loads maps 224, 226 to reconfigurable accelerators 102, 104, processor 340 may capture map copy 228 and store map copy 228 in memory 336.

When map copy 228 is received by accelerator reconfiguration device 116, processor 340 may identify which virtual machine is under execution by processor core 108. For example, processor 340 may communicate with virtual machine manager 120 and/or processor core 108 to identify the virtual machine under execution. Alternatively, virtual machine manager 120 may send a signal, such as trigger 222, to accelerator reconfiguration device 116 indicating what virtual machine is under execution. Processor 340 may then update virtual machine to accelerator relationships data 332 to associate the virtual machine under execution with the corresponding accelerator and map.

Trigger 222 may be detected by virtual machine switch detector 334 in a variety of ways. For example, virtual machine manager 120 may generate a specific signal or instruction relating to switch command 142. The signal or instruction may include an indication of which virtual machine is currently under execution on processor core 108. Virtual machine switch detector 334 may be configured to detect the signal or instruction relating to switch command 142.

In another example, a direct memory access environment may be used to wall off location ranges in memory 106 so that those ranges belong to particular virtual machines and are inaccessible to other virtual machines. Virtual machine to accelerator relationship data 332 may store associations between virtual machines and memory location ranges. Processor 340 may then analyze virtual machine to accelerator relationship data 332 and detect that processor core 108 has switched to executing a different virtual machine based upon memory locations being accessed. For example, a first virtual machine may be associated memory locations 1 through 5 of memory 106. A second virtual machine may be associated with memory locations 6 through 10 in memory 106. Virtual machine to accelerator relationship data 332 may be configured to store indications of a virtual machine, an associated accelerator, a map, and a range of memory locations in memory 106. When processor core 108 accesses a memory location, virtual machine switch detector 334 may compare the accessed memory location to a location range of a current virtual machine. If the accessed memory location is outside of the location range of the current virtual machine, virtual machine switch detector 334 may determine that processor core 108 has switched—effectively detecting trigger 222. Virtual machine switch detector 334 may also identify the new virtual machine based on the accessed memory location. In another example, a virtual machine switch 222 may be detected when core 108 clears caches or pipelines, for example detecting the transfer of state to virtual machine control block areas in memory during virtual machine switching by monitoring a defined memory area used in such transitions.

In some examples, virtual machines may share one or more cores and/or one virtual machine may extend across more than one core. Virtual machines may also share reconfigurable accelerators. Virtual machine to accelerator relationship data 332 may be adapted to keep track of relationships between virtual machines and reconfigurable accelerators across multiple cores and/or multiple accelerators.

Figure 4:
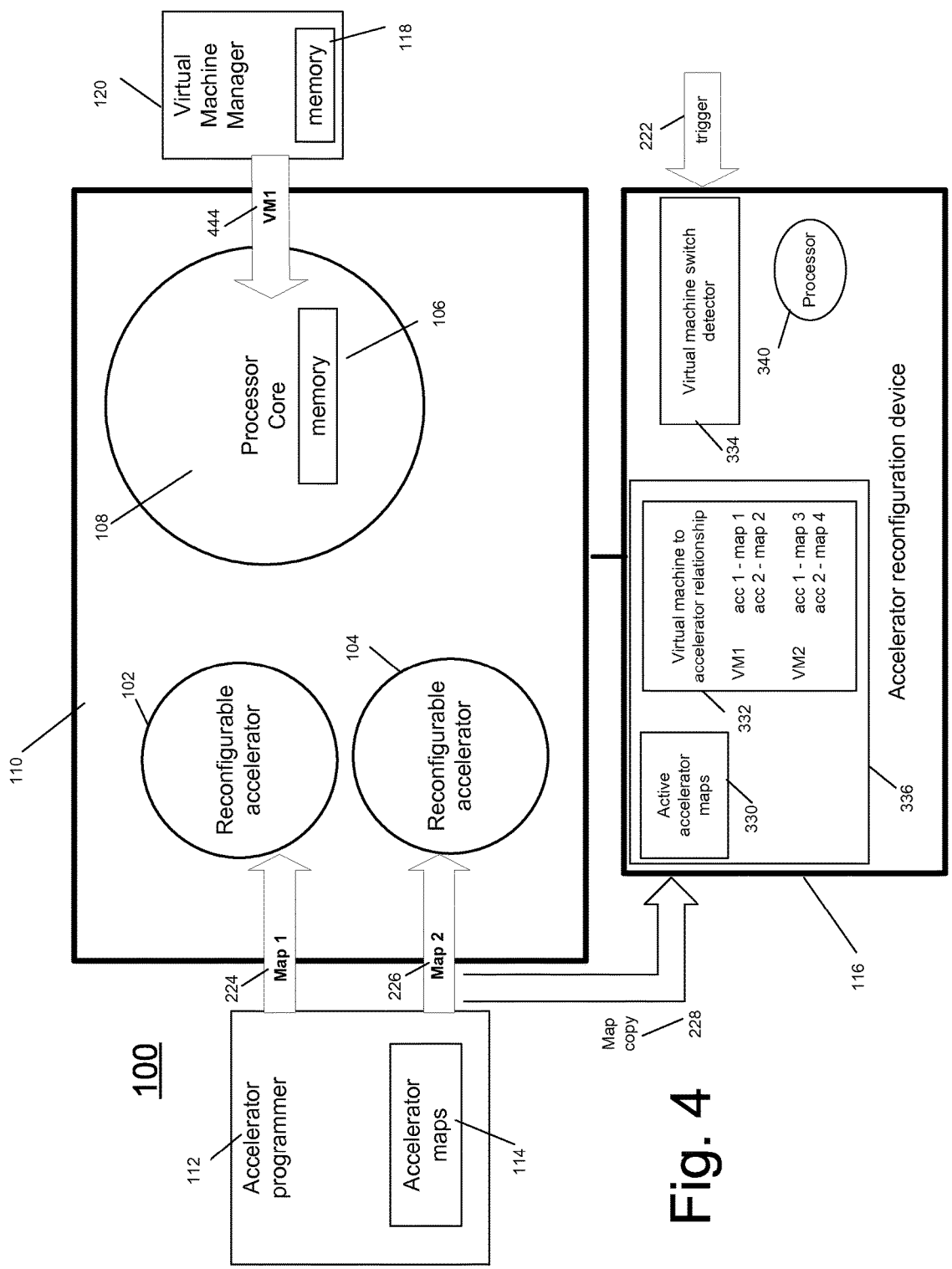
FIG. 4 illustrates an example system that can be utilized to implement reconfiguration with virtual machine switching.

FIG. 4 illustrates an example system that can be utilized to implement accelerator reconfiguration with virtual machine switching arranged in accordance with at least some embodiments described herein. Those components in FIG. 4 that are labeled identically to components of FIGS. 1, 2 and 3 will not be described again for the purposes of clarity.

In an example, virtual machine manager 120 may send a command 444 to processor core 108 to implement a first virtual machine "VM1". In response to command 444, processor core 108 may request that maps 1 and 2 be loaded from accelerator programmer 112 to reconfigurable accelerators 102, 104. Accelerator reconfiguration device 116 may detect that maps 224, 226 are being loaded to reconfigurable accelerators 102, 104. Accelerator reconfiguration device 116 may extract map copy 228 and store map copy 228 in active accelerator maps 330. Processor 340 of accelerator reconfiguration device 116 may further detect that the first virtual machine is active while map 1 and map 2 are written. Processor 340 may store an association between the first virtual machine and maps 1 and 2, for accelerators 1 and 2 respectively, in virtual machine to accelerator relationship data 332. In the example, processor 340 may have also previously stored an association between a second virtual machine ("VM2") and map 3 and map 4, for accelerators 1 and 2 respectively, in virtual machine to accelerator relationship data 332.

Figure 5:
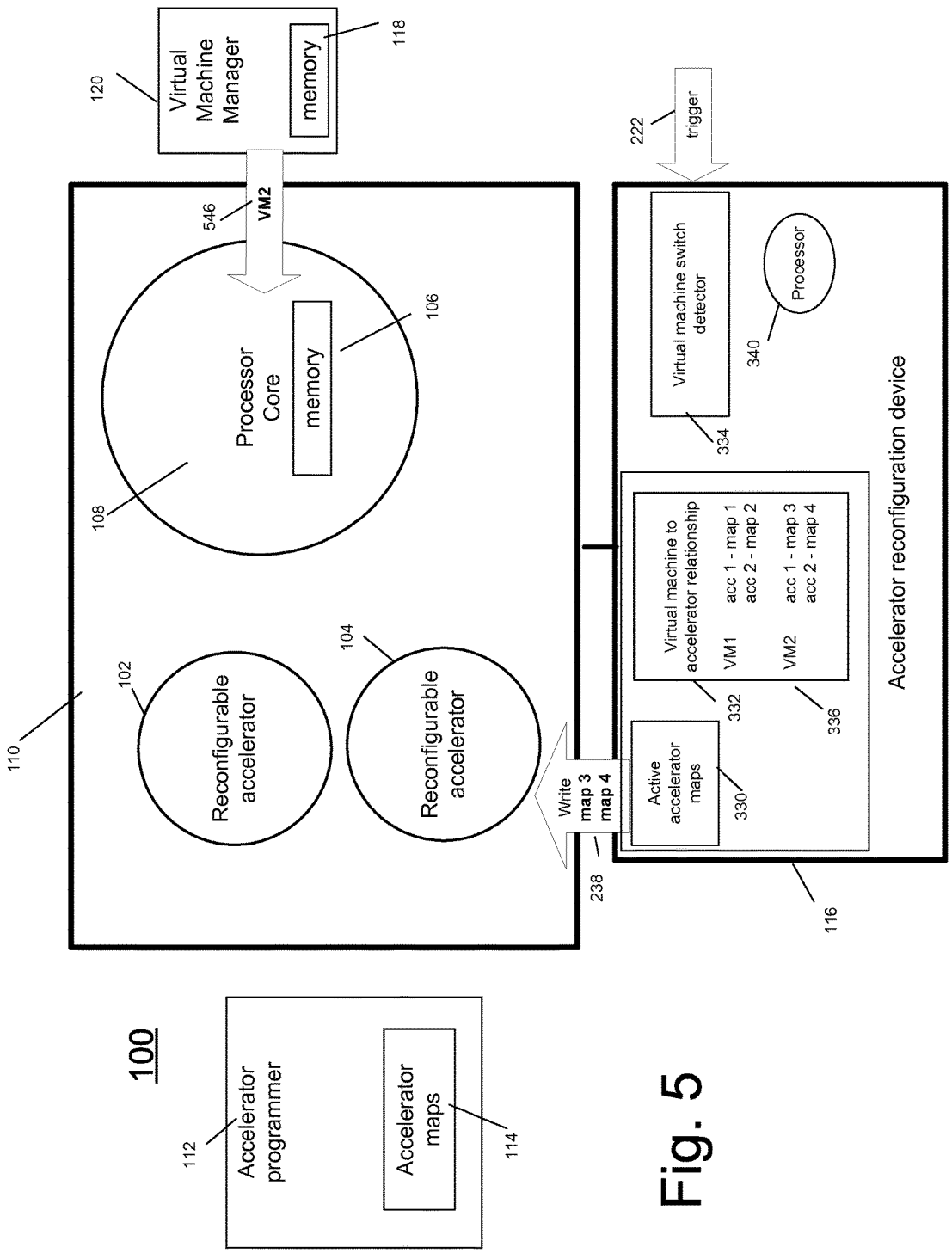
FIG. 5 illustrates an example system that can be utilized to implement reconfiguration with virtual machine switching.

FIG. 5 illustrates an example system that can be utilized to implement reconfiguration with virtual machine switching arranged in accordance with at least some embodiments described herein. Those components in FIG. 5 that are labeled identically to components of FIGS. 1, 2, 3 and 4 will not be described again for the purposes of clarity.

Continuing with the example of FIG. 4, virtual machine manager 120 may send a command 546 to processor core 108 to switch to a second virtual machine ("VM2"). As virtual machine manager 120 has switched virtual machines, a trigger 222 may be generated and detected as discussed herein. Virtual machine switch detector 334 may detect trigger 222 and identify that the second virtual machine is now being implemented on processor core 108. Processor 340 may analyze virtual machine to accelerator relationship data 332 and determine that map 3 and map 4 are associated with virtual machine 2 and accelerators 1 and 2. Processor 340 may then send write command 238 to write map 3 to reconfigurable accelerator 102 and map 4 to reconfigurable accelerator 104.

Among other possible benefits, a system in accordance with the disclosure may be able to allow virtual machines to effectively work with relevant reconfigurable accelerators. Virtual machines may be prevented from working with accelerators associated with, or configured for, other virtual machines. Security may be improved in that a virtual machine may avoid working with a processor with an accelerator used by a prior virtual machine.

Figure 6:
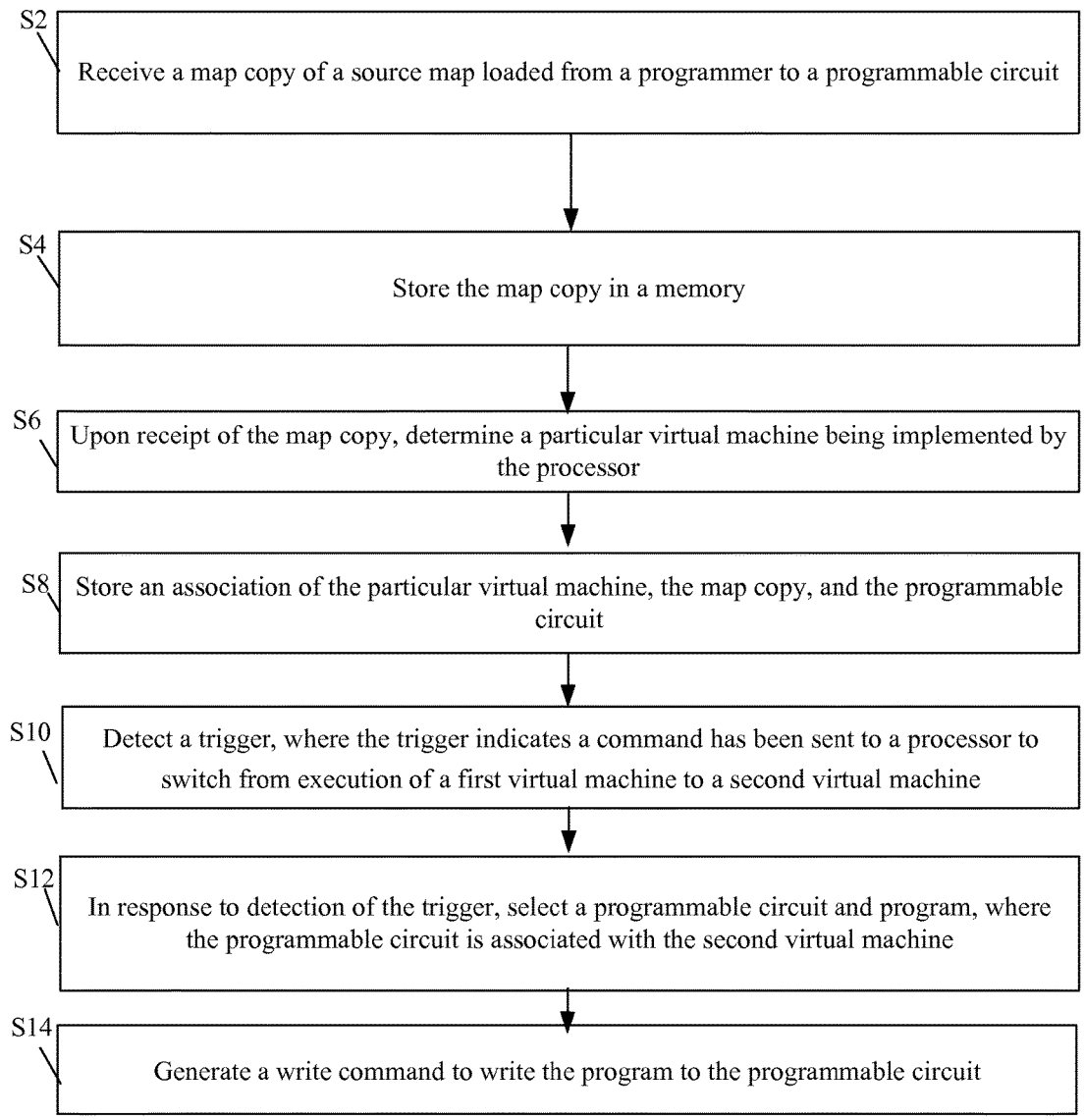
FIG. 6 depicts a flow diagram for an example process for implementing reconfiguration with virtual machine switching.

FIG. 6 depicts a flow diagram for an example process for implementing reconfiguration with virtual machine switching arranged in accordance with at least some embodiments described herein. In some examples, the process in FIG. 6 could be implemented using system 100 discussed above.

An example process may include one or more operations, actions, or functions as illustrated by one or more of blocks S2, S4, S6, S8, S10, S12 and/or S14. Although illustrated as discrete blocks, various blocks may be divided into additional blocks, combined into fewer blocks, or eliminated, depending on the desired implementation.

Processing may begin at block S2, "Receive a map copy of a source map loaded from a programmer to a programmable circuit." At block S2, a reconfiguration device, such as an accelerator reconfiguration device, may receive a map copy of a source map loaded from a programmer to a programmable circuit.

Processing may continue from block S2 to block S4, "Store the map copy in a memory." At block S4, the reconfiguration device may store the map copy in a memory.

Processing may continue from block S4 to block S6, "Upon receipt of the map copy, determine a particular virtual machine being implemented by the processor." At block S6, the reconfiguration device may, upon receipt of the map copy, determine that a particular virtual machine is being implemented by the processor.

Processing may continue from block S6 to block S8, "Store an association of the particular virtual machine, the map copy, and the programmable circuit." At block S8, the reconfiguration device may store an association of the particular virtual machine, the map copy and the accelerator.

Processing may continue from block S8 to block S10, "Detect a trigger, where the trigger indicates a command has been sent to a processor to switch from execution of a first virtual machine to a second virtual machine." At block S10, the reconfiguration device may detect a trigger. The trigger may indicate a command has been sent to a processor for the processor to switch from execution of a first virtual machine to a second virtual machine. The trigger may be, for example, a signal sent by a virtual machine manager. The trigger may include detection that the processor has accessed a memory location associated with the second virtual machine. The trigger may include detection that the processor has cleared a cache or pipeline.

Processing may continue from block S10 to block S12, "In response to detection of the trigger, select a programmable circuit and program, where the programmable circuit is associated with the second virtual machine." At block S12, the reconfigurable circuit may identify a programmable circuit and program associated with the second virtual machine.

Processing may continue from block S12 to block S14, "Generate a write command to write the program to the programmable circuit." At block S14, the reconfigurable circuit may generate a write command to write the program to the programmable circuit.

Figure 7:
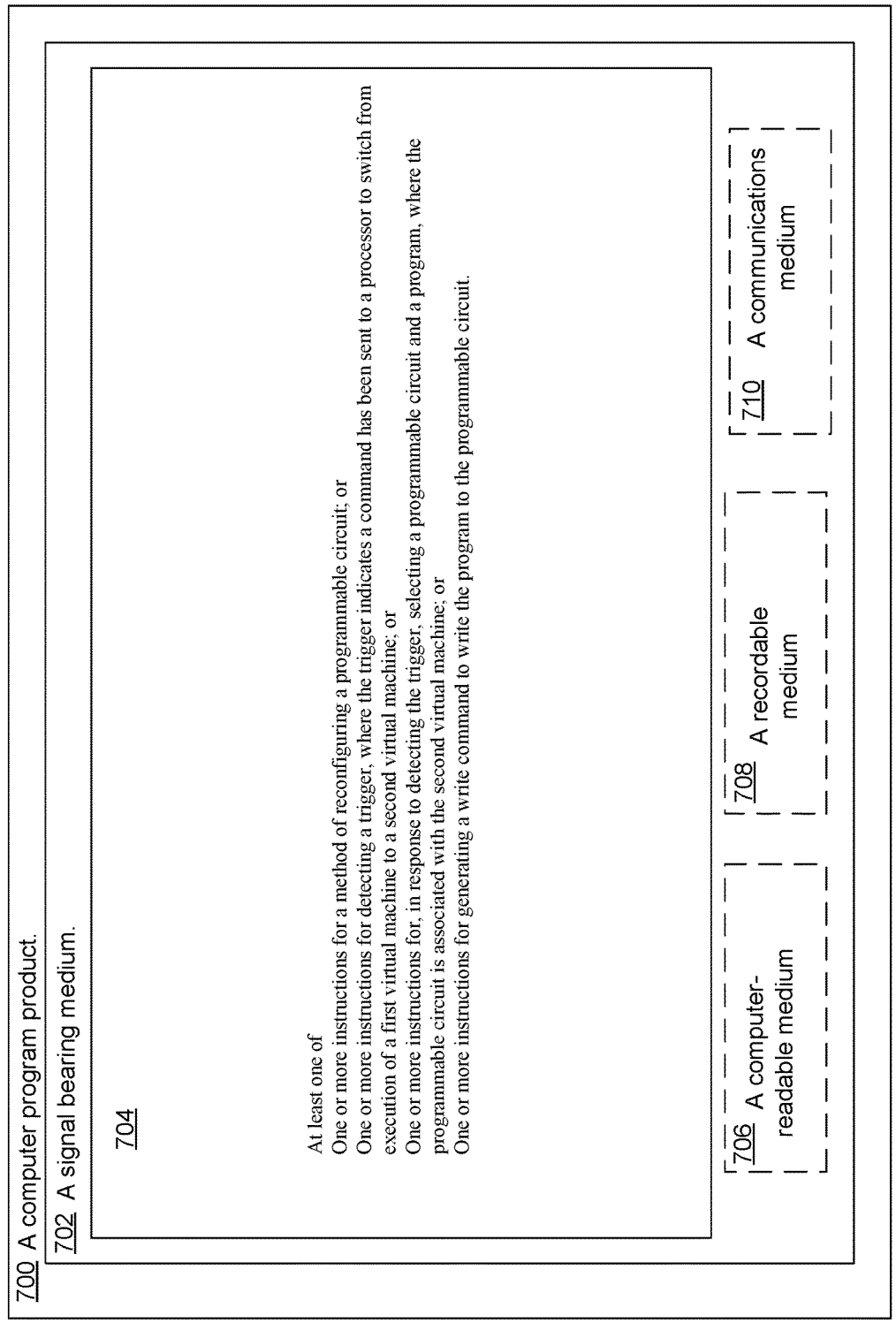
FIG. 7 illustrates a computer program product that can be utilized to implement reconfiguration with virtual machine switching.

FIG. 7 illustrates an example computer program product 700 that can be utilized to implement reconfiguration with virtual machine switching arranged in accordance with at least some embodiments described herein. Computer program product 700 may include a signal bearing medium 702. Signal bearing medium 702 may include one or more instructions 704 that, when executed by, for example, a processor, may provide the functionality described above with respect to FIGS. 1-6. Thus, for example, referring to system 100, accelerator reconfiguration device 116 may undertake one or more of the blocks shown in FIG. 7 in response to instructions 704 conveyed to the system 100 by signal bearing medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the system 100 by an RF signal bearing medium 702, where the signal bearing medium 702 is conveyed by a wireless communications medium 710 (e.g., a wireless communications medium conforming with the IEEE 802.11 standard).

FIG. 8 is a block diagram illustrating an example computing device 800 that is arranged to implement reconfiguration with virtual machine switching arranged in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. Processor 804 may include a programmable circuit 817 such as reconfigurable accelerators 102 and/or 104. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a reconfiguration with virtual machine algorithm 826 that is arranged to perform the functions as described herein including those described with respect to system 100 of FIGS. 1-7. Program data 824 may include reconfiguration with virtual machine switching data 828 that may be useful to implement reconfiguration with virtual machine switching as is described herein. In some embodiments, application 822 may be arranged to operate with program data 824 on operating system 820 such that reconfiguration with virtual machine switching may be provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A method to reconfigure a programmable circuit, the method comprising:
    detecting a trigger, wherein the trigger indicates that a command has been sent to a processor to switch from execution of a first virtual machine to a second virtual machine;
    in response to detection of the trigger, identifying the second virtual machine in relationship data, wherein the relationship data is effective to indicate:
        an association among a first accelerator map, the programmable circuit, and the first virtual machine; and
        an association among a second accelerator map, the programmable circuit, and the second virtual machine;
    in response to identification of the second virtual machine in the relationship data, selecting the second accelerator map from among the first and second accelerator maps based on the relationship data, wherein the first accelerator map is effective to define first states of gates of the programmable circuit, the second accelerator map is effective to define second states of gates of the programmable circuit, the first states of gates correspond to the execution of the first virtual machine by the processor with use of the programmable circuit, and the second states of gates correspond to the execution of the second virtual machine by the processor with use of the programmable circuit; and
    generating a write command to write the second accelerator map to the programmable circuit.

2. The method of claim 1, further comprising:
    receiving the trigger from a virtual machine manager, wherein the trigger indicates that the virtual machine manager has sent the command to switch from execution of the first virtual machine to the second virtual machine.

3. The method of claim 1, wherein selecting the second accelerator map comprises identifying an accelerator and an accelerator map associated with the second virtual machine.

4. The method of claim 3, further comprising:
    receiving an accelerator map copy of a source accelerator map loaded to the programmable circuit; and
    storing the accelerator map copy in a memory.

5. The method of claim 4, wherein generating the write command comprises generating the write command to write the accelerator map copy to the accelerator.

6. The method of claim 3, further comprising:
receiving a map copy of a source map loaded to the accelerator;
storing the map copy in a memory;
in response to receipt of the map copy, determining a particular virtual machine that is implemented on the processor;
determining an association between the particular virtual machine, the map copy, and the accelerator;
storing the association in the memory; and
in response to determination of the association, generating the write command using the map copy stored in the memory.

7. The method of claim 1, wherein detecting the trigger includes detecting the trigger in response to a signal from a virtual machine manager.

8. The method of claim 1, wherein detecting the trigger includes detecting that the processor has accessed a memory location associated with the second virtual machine.

9. The method of claim 1, wherein detecting the trigger includes detecting that the processor has cleared a cache or pipeline.

10. The method of claim 3, further comprising:
receiving a map copy of a source map loaded to the accelerator;
storing the map copy in a memory;
in response to receipt of the map copy, determining a particular virtual machine that is implemented by the processor;
determining an association between the particular virtual machine, the map copy, and the accelerator;
storing the association in the memory; and
in response to determination of the association, generating the write command using the map copy stored in the memory,
wherein detecting the trigger includes detecting that the processor has accessed a memory location associated with the second virtual machine.

11. A device effective to reconfigure a programmable circuit, the device comprising:
a switch detector, the switch detector effective to detect a trigger, wherein the trigger indicates that a command has been sent to a first processor to switch from execution of a first virtual machine to a second virtual machine; and
a second processor configured to be in communication with the switch detector,
the second processor effective to:
in response to detection of the trigger, identify the second virtual machine in relationship data, wherein the relationship data is effective to indicate:
an association among a first accelerator map, an accelerator for the programmable circuit, and the first virtual machine; and
an association among a second accelerator map, the accelerator for the programmable circuit, and the second virtual machine;
in response to identification of the second virtual machine, identify the second accelerator map from among the first and second accelerator maps based on relationship data, wherein the first accelerator map is effective to define first states of gates of the accelerator, the second accelerator map is effective to define second states of gates of the accelerator, the first states of gates correspond to the execution of the first virtual machine by the first processor with use of the accelerator, and the second states of gates correspond to the execution of the second virtual machine by the first processor with use of the accelerator; and
generate a write command to write the second accelerator map to the accelerator.

12. The device of claim 11, wherein:
the trigger indicates that a virtual machine manager has sent the command to switch from execution of the first virtual machine to the second virtual machine.

13. The device of claim 11, further comprising a memory that stores the relationship data.

14. The device of claim 11, wherein the second processor is further effective to:
receive a map copy of a source map loaded to the programmable circuit;
store the map copy in a memory; and
generate the write command based on the map copy stored in the memory.

15. The device of claim 11, wherein the second processor is further effective to:
receive a map copy of a source map loaded to the accelerator;
store the map copy in a memory;
in response to receipt of the map copy, determine a particular virtual machine that is implemented by the first processor;
determine an association between the particular virtual machine, the map copy, and the accelerator;
store the association in the memory; and
in response to determination of the association, generate the write command based on the map copy stored in the memory.

16. The device of claim 11, wherein the switch detector is effective to detect the trigger in response to a signal from a virtual machine manager.

17. The device of claim 11, wherein the switch detector is effective to detect the trigger by detection that a virtual machine manager has accessed a memory location associated with the second virtual machine.

18. The device of claim 11, wherein the switch detector is effective to detect the trigger by detection that the first processor has cleared a cache or pipeline.

19. A system effective to reconfigure a programmable circuit, the system comprising:
a first processor;
a virtual machine manager coupled to the first processor and effective to send a command to the first processor to switch from execution of a first virtual machine to a second virtual machine, the virtual machine manager further effective to generate a trigger in response to the command;
a programmable circuit; and
a reconfiguration device coupled to the virtual machine manager and the programmable circuit, wherein the reconfiguration device includes a second processor, the second processor effective to:
detect the trigger;
in response to detection of the trigger, identify the second virtual machine in relationship data, wherein the relationship data is effective to indicate:
an association among a first map, the programmable circuit, and the first virtual machine; and
an association among a second map, the programmable circuit, and the second virtual machine;
in response to identification of the second virtual machine, identify the second map from among the first and second maps based on relationship data, wherein the first map is effective to define first states of gates of the programmable circuit, the second map is effective to define second states of gates of the programmable circuit, the first states of gates correspond to the execution of the first virtual machine by the first processor with use of the programmable circuit, and the second states of gates correspond to the execution of the second virtual machine by the first processor with use of the programmable circuit; and generate a write command to write the second map to the programmable circuit.

20. The system of claim 19, wherein the trigger relates to a world switch of the first processor.

21. The system of claim 19, wherein the programmable circuit includes an accelerator and the system further comprises:

an accelerator programmer effective to load a source map to the accelerator, wherein the second processor is further effective to:
receive a map copy of the source map;
store the map copy in a memory; and
generate the write command based on the map copy stored in the memory.

22. The system of claim 19, wherein the programmable circuit includes an accelerator and the system further comprises:

an accelerator programmer effective to load a source map to the accelerator, wherein the second processor is further effective to:
receive a map copy of the source map;
store the map copy in a memory;
in response to receipt of the map copy, determine a particular virtual machine that is implemented by the first processor;
determine an association between the particular virtual machine, the map copy, and the accelerator;
store the association in the memory; and
in response to determination of the association, generate the write command based on the map copy stored in the memory.

23. The system of claim 19, wherein the second processor includes a switch detector effective to detect the trigger by detection that the virtual machine manager has accessed a memory location associated with the second virtual machine.

24. The system of claim 19, wherein the second processor includes a switch detector effective to detect the trigger in response to a signal from the virtual machine manager.

25. The system of claim 19, wherein the second processor includes a switch detector effective to detect the trigger in response to detection that the first processor has cleared a cache or pipeline.

26. The method of claim 1, wherein one or more of the gates of the programmable circuit and/or switches of the programmable circuit are reconfigurable.

* * * * *